(12) United States Patent
Takao et al.

(10) Patent No.: US 7,515,398 B2
(45) Date of Patent: Apr. 7, 2009

(54) GAS-INSULATED SWITCHGEAR ASSEMBLY

(75) Inventors: Hiroshi Takao, Kanagawa (JP);
Masayuki Fukunaga, Kanagawa (JP);
Reiji Ohara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 295 days.

(21) Appl. No.: 11/384,424

(22) Filed: Mar. 21, 2006

(65) Prior Publication Data

US 2006/0215356 A1 Sep. 28, 2006

(30) Foreign Application Priority Data

Mar. 22, 2005 (JP) .............................. 2005-081126

(51) Int. Cl.
*H02B 1/20* (2006.01)
(52) U.S. Cl. ........................ 361/612; 361/602; 361/605; 218/75; 218/79
(58) Field of Classification Search ................. 361/602, 361/604, 605, 612; 218/43–85, 152–158
See application file for complete search history.

(56) References Cited

U.S. PATENT DOCUMENTS

| | | | | |
|---|---|---|---|---|
| 4,493,008 A | * | 1/1985 | Haginomori | ................. 361/612 |
| 5,200,881 A | * | 4/1993 | Itai | ............................. 361/604 |
| 5,590,018 A | | 12/1996 | Watahiki et al. | |
| 5,757,614 A | * | 5/1998 | Hachida et al. | ............. 361/602 |
| 5,991,148 A | * | 11/1999 | Heil et al. | .................... 361/605 |
| 6,016,247 A | * | 1/2000 | Dams et al. | .................. 361/602 |
| 6,232,571 B1 | * | 5/2001 | Starck et al. | ................. 218/153 |
| 6,624,372 B1 | * | 9/2003 | Ogawa et al. | .................. 218/71 |
| 6,646,861 B1 | * | 11/2003 | Watanabe et al. | ........... 361/612 |
| 6,664,493 B2 | | 12/2003 | Yamada et al. | |
| 2005/0141176 A1 | * | 6/2005 | Kikukawa et al. | ........... 361/605 |
| 2007/0153449 A1 | * | 7/2007 | Kashiwa et al. | .............. 361/612 |

FOREIGN PATENT DOCUMENTS

| | | |
|---|---|---|
| JP | 4-109806 A | 4/1992 |
| JP | 7-34603 B2 | 4/1995 |
| JP | 8-037708 A | 2/1996 |
| JP | 11-008916 A | 1/1999 |
| JP | 11-146522 A | 5/1999 |
| KR | 2003-0051357 A | 6/2003 |

* cited by examiner

*Primary Examiner*—Jayprakash N Gandhi
*Assistant Examiner*—Courtney L Smith
(74) *Attorney, Agent, or Firm*—Foley & Lardner LLP (57) ABSTRACT

In a one-and-a-half circuit breaker system gas-insulated switchgear assembly for three-phase AC transmission, the circuit breakers are located on a common horizontal floor directed in Y direction. First main bus bars extending in X direction are located above the first circuit breakers. The positions of the first main bus bars in different phases are different from one another only in height. Similarly, the second main bus bars extending in X direction are located above the third circuit breakers. Each phase of the main bus bars and disconnecting switches is located in a common horizontal plane. The heights are different for different phases. Relative locations of the disconnecting switches are substantially common for every phase horizontally, but are shifted in the X direction.

6 Claims, 7 Drawing Sheets

GAS-INSULATED SWITCHGEAR ASSEMBLY

CROSS-REFERENCE TO RELATED APPLICATIONS

This application is based upon and claims the benefits of priority from the prior Japanese Patent Application No. 2005-81126 filed on Mar. 22, 2005; the entire content of which is incorporated herein by reference.

BACKGROUND OF THE INVENTION

The present invention relates to a gas-insulated switchgear assembly for three-phase alternating current transmission, and more particularly to a layout of components of so-called one-and-a-half CB (circuit breaker) system gas-insulated switchgear assembly.

In a high-voltage substation that has concentrated systems and requires especially high reliability, the so-called one-and-a-half CB (circuit breaker) system is generally adopted as the bus bar system as shown in Japanese Laid Open Patent Hei 11-146522, the entire contend of which is incorporated herein by reference. Three circuit breakers are used in the one-and-a-half CB system for two feeders in order that an accident generated in the bus bar should not affect the system, and moreover the system is taken into consideration not to stop the lines while the circuit breakers, etc. are inspected.

Figure 1:
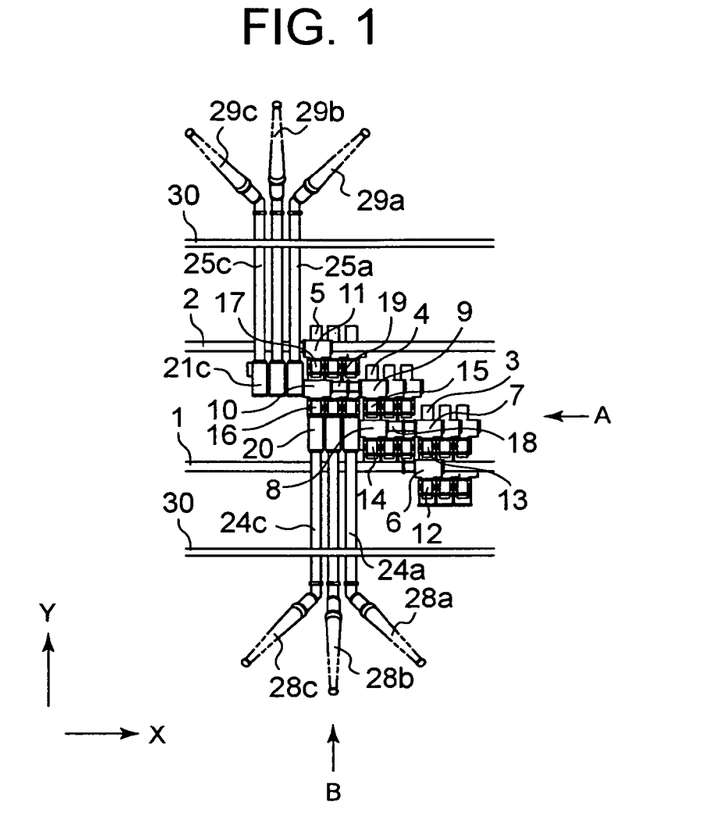
FIG. 1 is a plan view showing the first embodiment of the gas-insulated switchgear assembly in accordance with the present invention.
Figure 2:
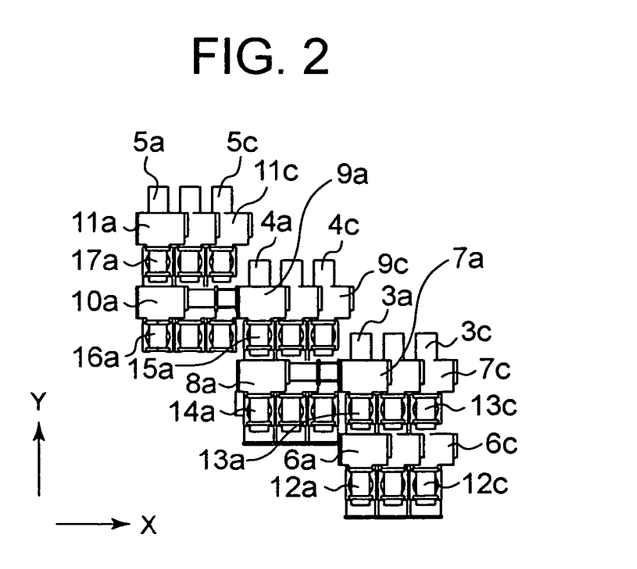
FIG. 2 is an enlarged plan view of the main part of FIG. 1.
Figure 3:
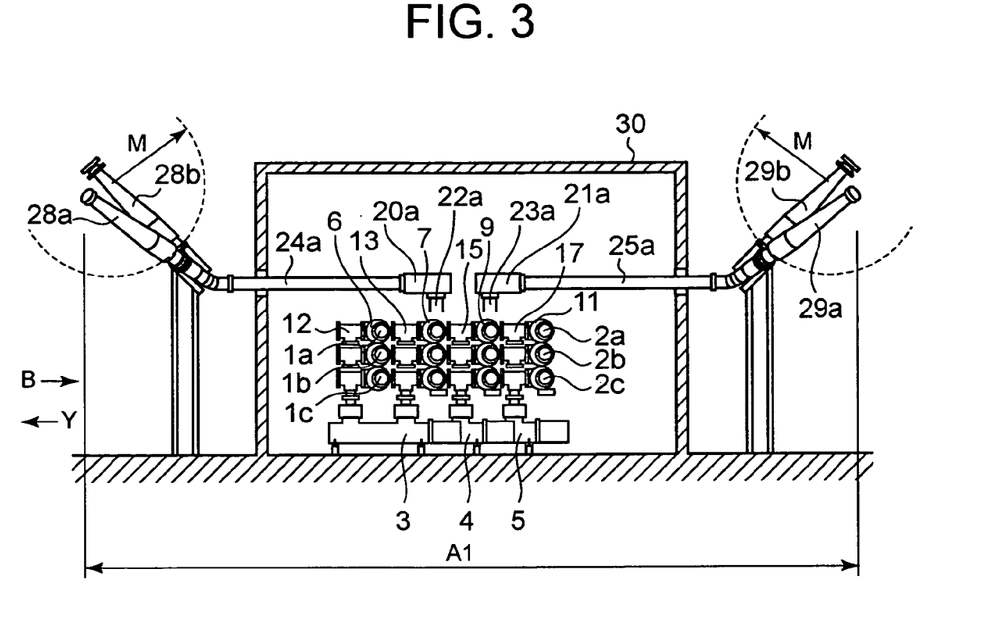
FIG. 3 is a side view observed in the direction of the arrow "A" in FIGS. 1 and 4.
Figure 4:
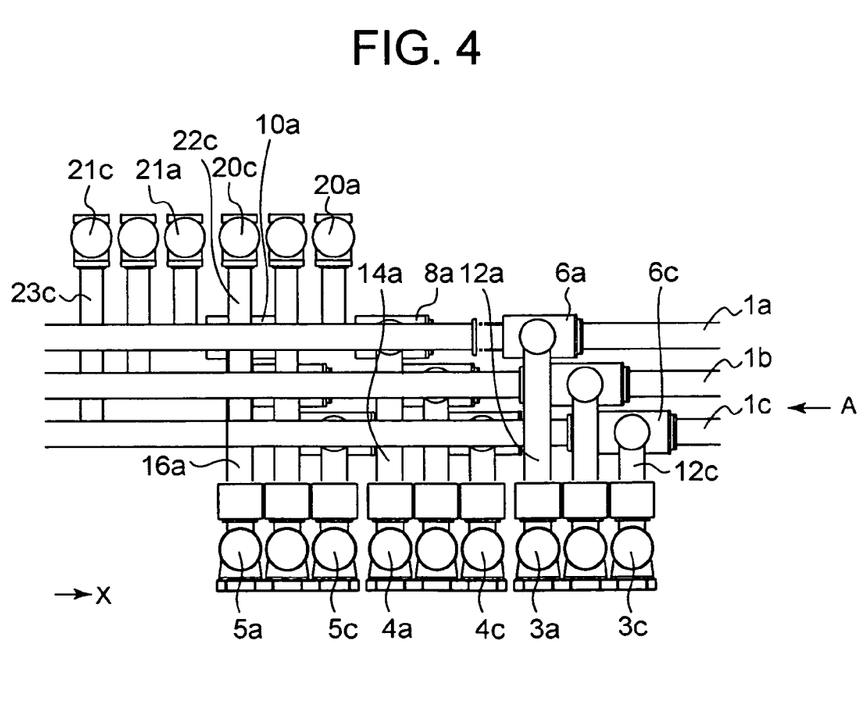
FIG. 4 is an elevation view of the main part of FIGS. 1 and 3 observed in the direction of the arrow B.
Figure 5:
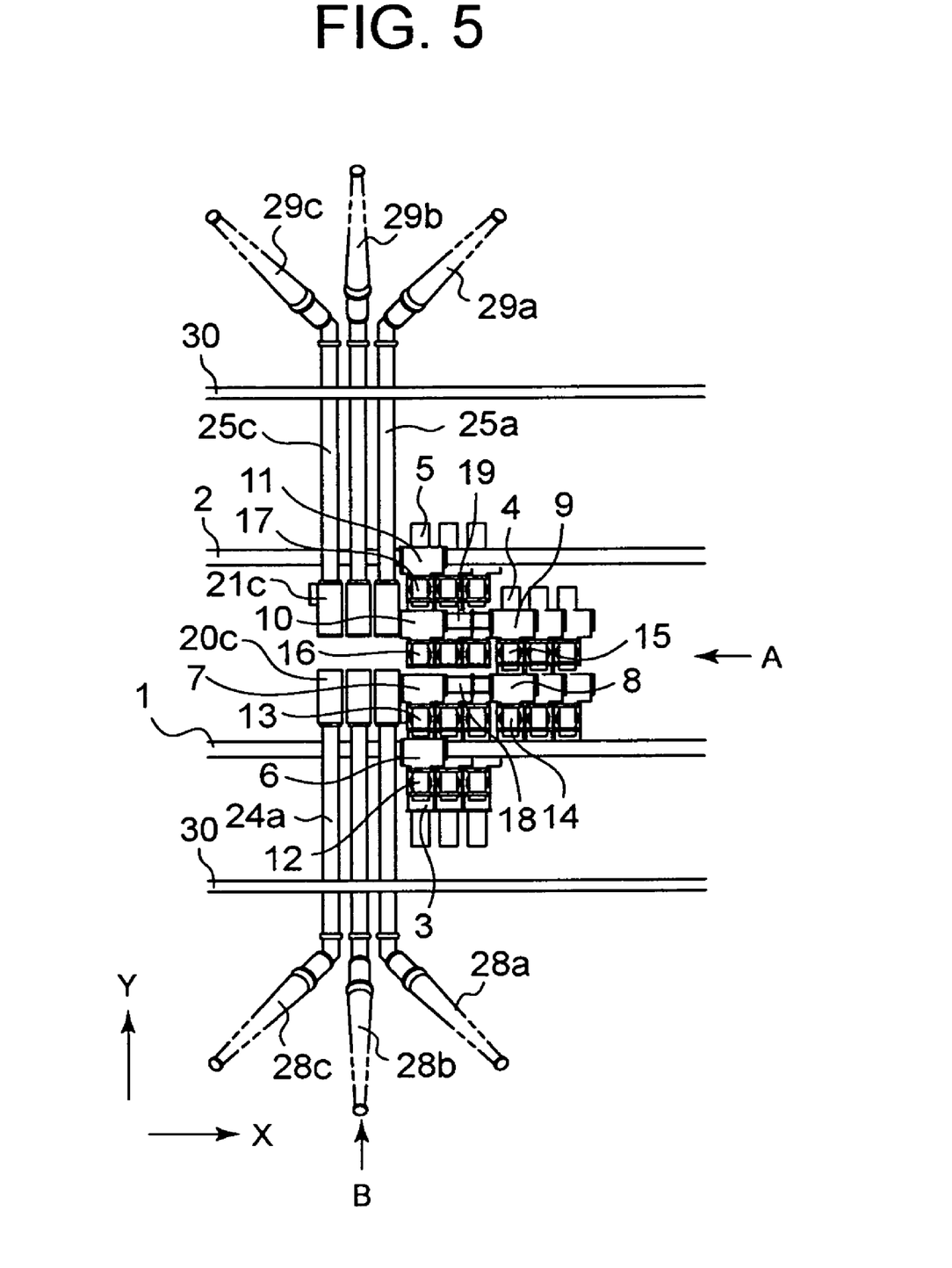
FIG. 5 is a plan view showing the second embodiment of the gas-insulated switchgear assembly in accordance with the present invention.
Figure 6:
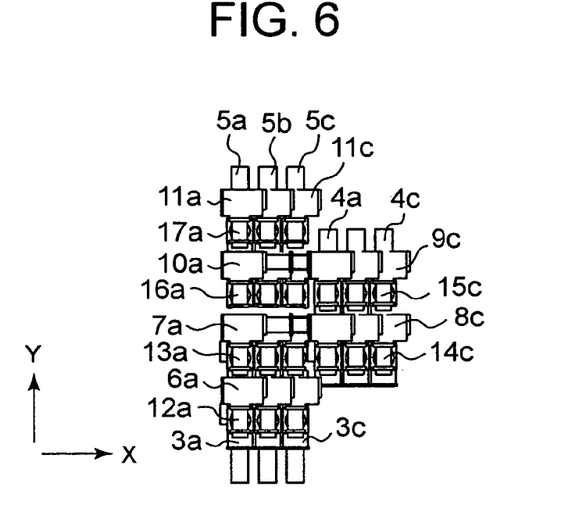
FIG. 6 is an enlarged plan view of the main part of FIG. 5.
Figure 7:
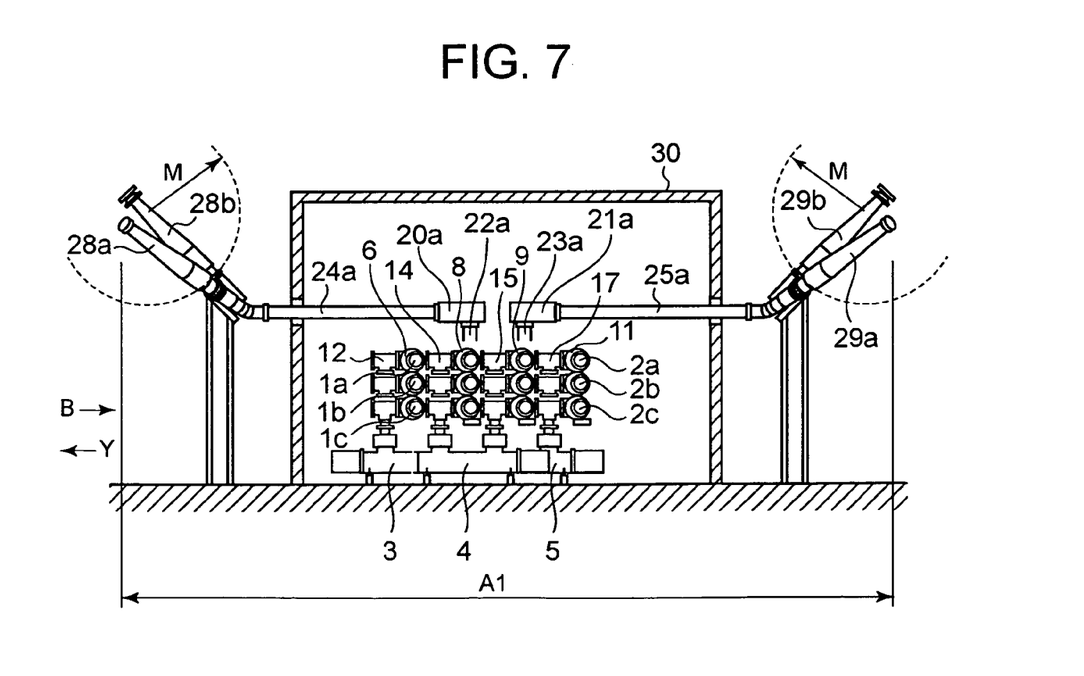
FIG. 7 is a side view observed in the direction of the arrow "A" in FIGS. 5 and 8.
Figure 8:
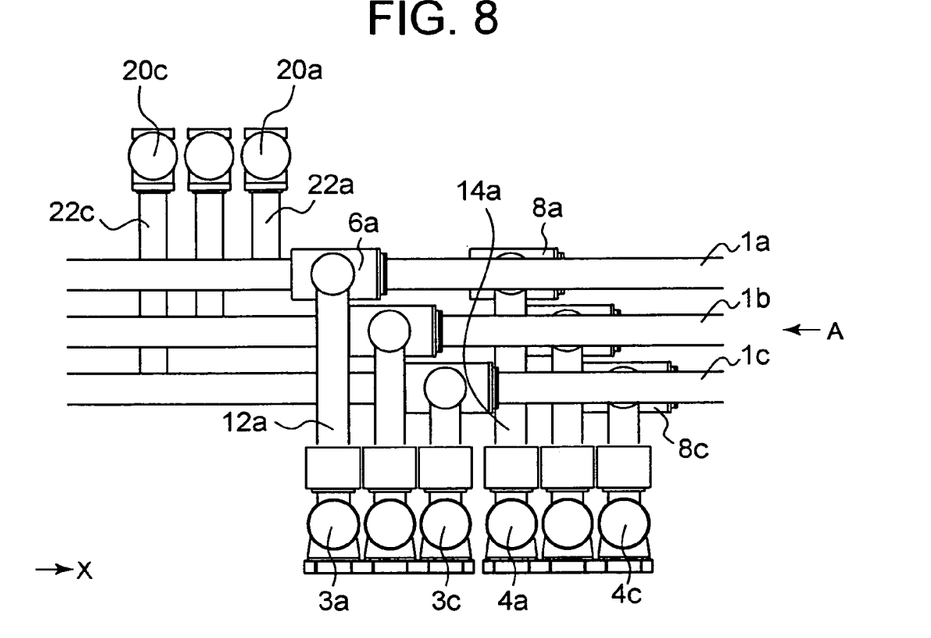
FIG. 8 is an elevation view of the main part of FIGS. 5 and 7 observed in the direction of the arrow B.
Figure 9:
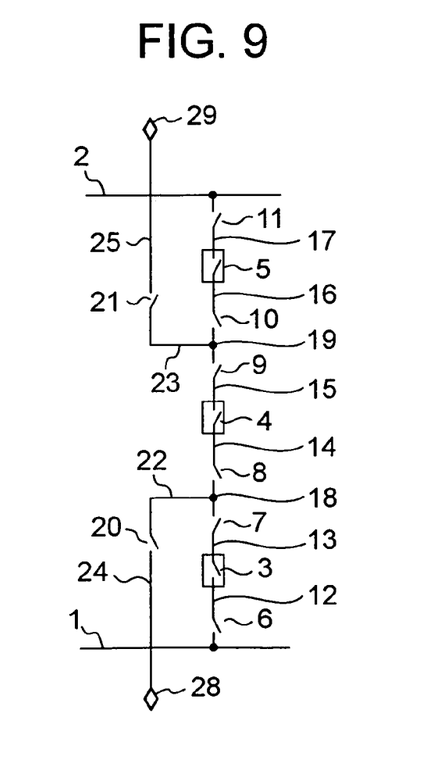
FIG. 9 is a single connecting diagram of the gas-insulated switchgear assembly according to the present invention and the conventional technology.

FIG. 9 shows a single line connecting diagram of such a one-and-a-half CB system. That is to say, the first main bus bar 1 and the second main bus bar 2 are respectively fed through the first bushing 28 and the second bushing 29, which are connected to external electric lines. In cases where any breakdown takes place in either the first main bus bar 1 or the second main bus bar 2, the first circuit breaker 3, the second circuit breaker 4 and the third circuit breaker 5 are prepared between the main bus bar 1 and the main bus bar 2 so as to break only the broken part, in order to make the remaining bus bar or the power line operated as being coupled.

In order to keep surely the disconnection, the first to sixth disconnecting switches 6 to 11 are connected to the both ends of the circuit breakers 3 to 5. Namely, the first main bus bar 1 is connected to the first disconnecting switch 6. The first circuit breaker 3, the second disconnecting switch 7, the third disconnecting switch 8, the second circuit beaker 4, the fourth disconnecting switch 9, the fifth disconnecting switch 10, the third circuit beaker 5, the sixth disconnecting switch 11 and the second main bus bar 2 are sequentially connected together in series through the connecting bus bars 12 to 17, following the first disconnecting switch 6.

The connecting bus bar 22 branches off from the connecting bus bar 18 between the second disconnecting switch 7 and the third disconnecting switch 8, and connected to the first feeding line 24 via the seventh disconnecting switch 20. The first feeding line 24 is connected to the first bushing 28 to receive electric power from an external feeding line. Similarly, the connecting bus bar 23 branches off from the connecting bus bar 19 between the fourth disconnecting switch 9 and the fifth disconnecting switch 10, and connected to the second feeding line 25 via the eighth disconnecting switch 21. The second feeding line 25 is connected to the second bushing 29 to receive electric power from an external feeding line.

Figure 10:
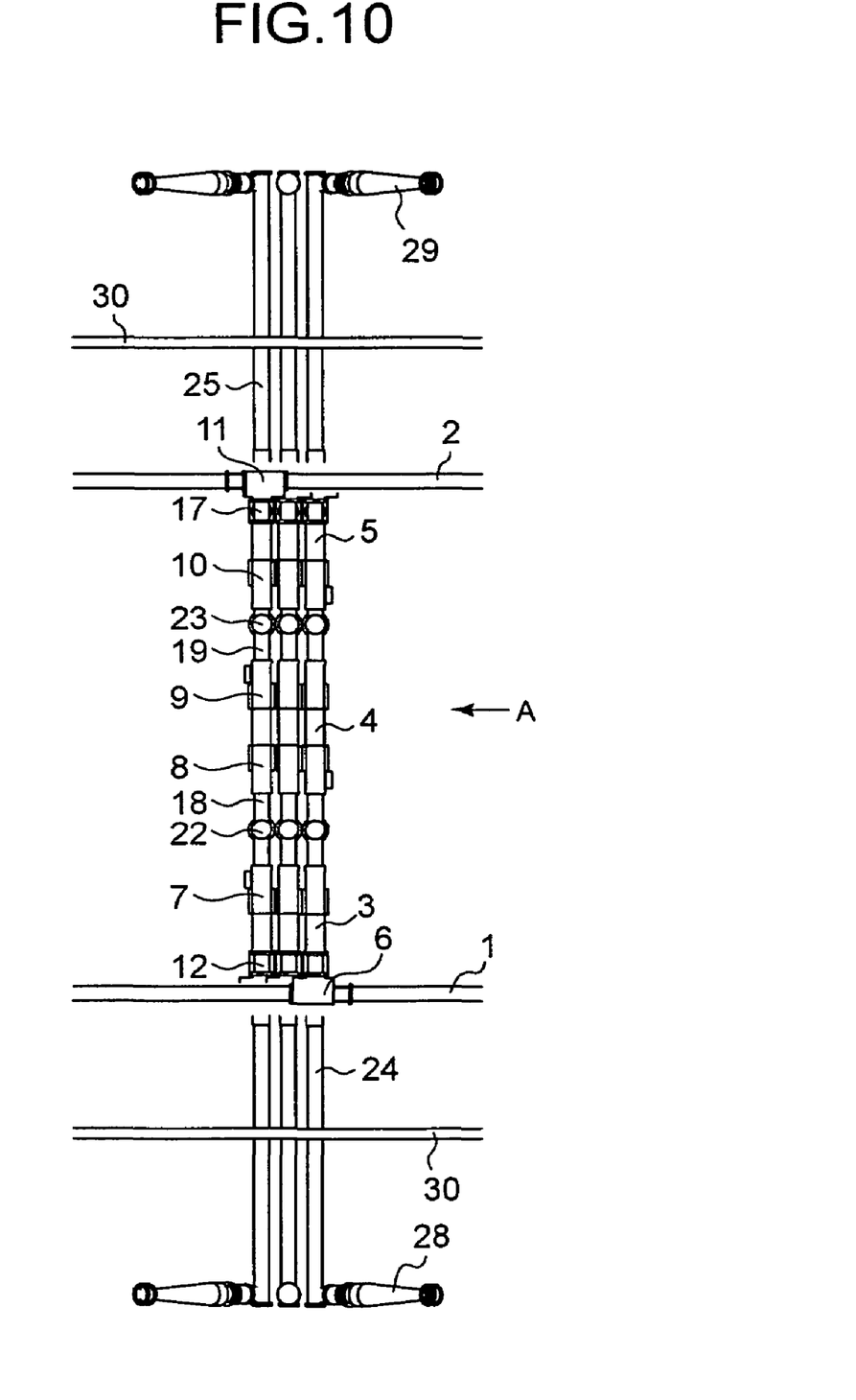
FIG. 10 is a plan view showing a conventional gas-insulated switchgear assembly.
Figure 11:
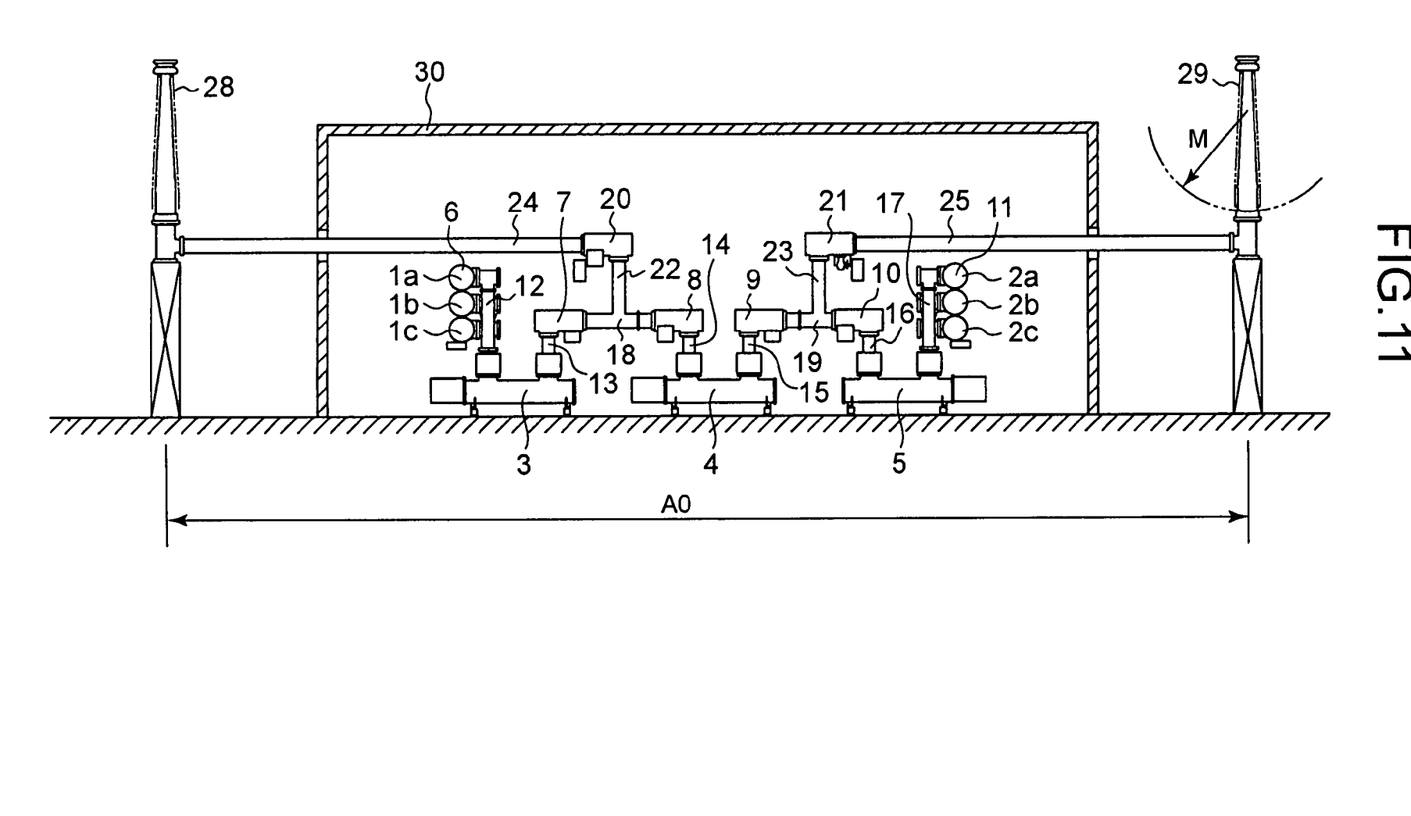
FIG. 11 is a side view of FIG. 10 observed in the direction of the arrow "A".

FIGS. 10 and 11 show an example of the layout of a conventional gas-insulated switchgear assembly comprising such switchgear assemblies constituted of gas-insulated devices. FIG. 10 shows a device for three phases. However, the structure for each phase is the same, so that explanation will be carried out for one phase referring to FIG. 11. Namely, between the first main bus bar 1 and the second main bus bar 2, both being located in parallel with each other, the horizontal type circuit breakers 3, 4 and 5 are connected together in series in the direction substantially perpendicular to the main bus bars. The main bus bars 1 and 2 are located in such a manner that the axis of every phase 1a to 1c and 2a to 2c can be positioned vertically above the first circuit breakers 3 and the third circuit breakers 5. The main bus bars 1 and 2 and the circuit breakers 3, 4 and 5 of every phase are mutually connected via the first and second disconnecting switches 6 and 7, the third and fourth disconnecting switches 8 and 9, and the fifth and sixth disconnecting switches 10 and 11, respectively.

The second disconnecting switches 7 are connected to the third disconnecting switches 8 via the connecting bus bars 18, and the fourth disconnecting switches 9 are connected to the fifth disconnecting switches 10 via the connecting bus bars 19. The upper branch portions (connecting bus bars) 22 and 23 are provided on the connecting bus bars 18 and 19. The horizontal type seventh disconnecting switches 20 and eighth disconnecting switches 21 for lead-out lines are connected to the upper branch portions 22 and 23. All devices mentioned above are accommodated in the building 30.

Furthermore, the connecting bus bars (feeding lines) 24 and 25 are connected to the horizontal outlets of the horizontal seventh and eighth disconnecting switches 20 and 21 for the lead-out lines in the direction perpendicular to the main bus bars 1 and 2. The connecting bus bars 24 and 25 are extended over the main bus bars 1 and 2, and pass through the building 30, then are connected to the bottom portions of the bushings 28 and 29, respectively. Positioning of the bushings 28 (or 29) are determined by the distance M between the bushing charger portion and the connecting portion of the connecting bus bars 24 (or 25) to the bushings.

In the one-and-a-half CB system gas-insulated switchgear assembly mentioned above, there were problems as follows. That is to say, because of difficulty in obtaining a site for a substation and in reducing the dimension of the building 30, it is more and more required that the installing area of the gas-insulated switchgear assembly should be reduced. However, the axes of the circuit breakers 3, 4 and 5 are common, so that the distance A0 between the bushings 28 and the bushings 29 becomes long. As a result, a wide installing area is necessary as a whole.

BRIEF SUMMARY OF THE INVENTION

Accordingly, it is an object of the present invention to provide an improved system or method for providing a gas-insulated switchgear assembly enabling its installing area to be reduced without changing the height thereof from the status quo.

According to the present invention, a gas-insulated switchgear assembly for three-phase alternating current transmission is provided which comprises, for each phase: a first disconnecting switch connected to a first main bus bar; a first circuit breaker connected to the first disconnecting switch; a second disconnecting switch connected to the first circuit breaker; a third disconnecting switch connected to the second disconnecting switch; a second circuit breaker connected to the third disconnecting switch; a fourth disconnecting switch connected to the second circuit breaker; a fifth disconnecting switch connected to the fourth disconnecting switch; a third circuit breaker connected to the fifth disconnecting switch; a sixth disconnecting switch connected to the third circuit breaker on an end and to a second main bus bar on another end; a first connecting bus bar branched off between the second disconnecting switch and the third disconnecting switch, the first connecting bus bar connected to a first feeding line; and a second connecting bus bar branched off between the fourth disconnecting switch and the fifth disconnecting switch, the second connecting bus bar connected to a second feeding line.

The first circuit breakers, the second circuit breakers and the third circuit breakers are arranged in such a manner that longitudinal axes thereof are in substantially parallel with one another in substantially one horizontal plane, the first circuit breakers for different phases, the second circuit breakers for different phases and the third circuit breakers for different phases are arranged side by side with one another. The first main bus bars and the second main bus bars are arranged substantially horizontally and substantially in parallel with each other at a height different from a height of the horizontal plane including the longitudinal axes of the circuit breakers, and in a direction different from a direction of the longitudinal axes of the circuit breakers. At least two out of the longitudinal axes of the first circuit breakers, the second circuit breakers and the third circuit breakers are shifted in a direction different from the direction of the longitudinal axes, and at least two out of positions of the first circuit breakers, the second circuit breakers and the third circuit breakers in the direction of the longitudinal axes are arranged so as to be partially overlapped.

In accordance with the gas-insulated switchgear assembly of the present invention, the installing area thereof can be reduced and its components can be simplified.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE PRESENT INVENTION

Referring to FIGS. 1 through 9, some embodiments according to the present invention will be explained. Here, the same or a similar part as the part in the explanation of the background technology is represented by a common mark to eliminate repeated explanation. In FIGS. 1 through 8, any part having a mark suffixed with a, b or c, represents distinctively the phase a, phase b or phase c respectively, but the denotations a, b and c may be omitted in some cases.

The First Embodiment

Referring to FIGS. 1 through 4, the first embodiment will be explained. The single connection diagram of this embodiment is the same as that of the general one-and-a-half CB system shown in FIG. 9.

The first main bus bars 1 and the second main bus bars 2 both extend horizontally, and in parallel with each other. This direction is defined as an "X" direction. The horizontal direction perpendicular to the X direction is defined as a "Y" direction.

The first to the third circuit breakers 3 to 5 are arranged on a common horizontal floor. The circuit breakers 3 to 5 have a substantially cylindrical and elongated shape, and are arranged so that the longitudinal axes thereof be all directed to the Y direction. Three portions corresponding to three phases of the first circuit breakers 3, i.e. the first circuit breakers 3a, 3b and 3c are arranged in parallel with and adjacent to one another. Three portions corresponding to three phases of the second circuit breakers 4, and three portions corresponding to three phases of the third circuit breakers 5, respectively, are arranged likewise.

Above the first circuit breakers 3a, 3b and 3c, the first main bus bars 1a, 1b and 1c extending in the X direction are positioned. The positions of the first main bus bars 1a, 1b and 1c are different from one another only in height. Similarly, above the third circuit breakers 5a, 5b and 5c, the second main bus bars 2a, 2b and 2c extending in the X direction are positioned.

The circuit breakers 3 to 5 each has two upper outlets on the upper portion in the vicinity of the both ends thereof. The upper outlets are respectively connected to the connecting bus bars 12 to 17 extending in the vertical direction. The first disconnecting switches 6 to the sixth disconnecting switches 11 are arranged on and connected to the upper ends of these connecting bus bars 12 to 17, respectively. Each phase of the first main bus bar 1, the second main bus bar 2 and the first disconnecting switch 6 to the sixth disconnecting switch 11 is positioned in common horizontal planes whose heights are different from one another for every phase. The relationship of the positions of the first disconnecting switch 6 to the sixth disconnecting switch 11 in the horizontal direction for every phase is substantially the same, but the positions thereof are shifted slightly in the X direction.

The feeding lines 24 and 25 are extended in the Y direction above the first bus bars 1 and the second bus bars 2, respectively, and pass through the walls of the building 30, then connected to the bushings 28 and 29 outside the building 30. All phases of the feeding lines 24 and 25 are placed in the same horizontal plane.

In this embodiment, the first circuit breakers 3, the second circuit breakers 4 and the third circuit breakers 5 are arranged being shifted sequentially in the X direction, and arranged so as to be overlapped partially in the Y direction sequentially. More specifically, arrangement is as follows: the connecting bus bars 13 and 14 are lined up in the X direction; the second disconnecting switches 7 and the third disconnecting switches 8 are lined up in the X direction; the connecting bus bars 15 and 16 are lined up in the X direction; and the fourth disconnecting switches 9 and the fifth disconnecting switches 10 are lined up in the X direction.

In this embodiment, the longitudinal axes of the first to the third circuit breakers 3 to 5 are shifted in the X direction, and the positions of the first to the third circuit breakers 3 to 5 are partially overlapped in the Y direction. Accordingly, the located width of the first to the third circuit breakers 3 to 5 in the Y direction can become small as a whole, so that the distance A1 between the bushings can be smaller than the conventional one A0 (FIG. 11). Additionally, the first, the second and the third circuit breakers 3 to 5, and the disconnecting switches attached to the both ends of the first, the second and the third circuit breakers can be structured as the same unit. In consequence, the gas-insulated switchgear assembly of this embodiment is economical and capable of reducing the installation area. This gas-insulated switchgear assembly is extremely effective when the width thereof is severely restricted.

Furthermore, because the second disconnecting switches 7 and the third disconnecting switches 8 are connected together via the connecting bus bars 18 on the same axis lines, installation can be carried out without changing the dimension in the direction of the height from the conventional one. As a result, dimension of the building 30 where the devices mentioned above are installed can be reduced.

The Second Embodiment

Referring to FIGS. 5 through 8, the second embodiment will be explained. The single connection diagram in this embodiment is also equal to that of the general one-and-a-half CB system shown in FIG. 9.

The first main bus bars 1 and the second main bus bars 2 both extend horizontally, and in parallel with each other. This direction is defined as an "X" direction. The horizontal direction perpendicular to the X direction is defined as a "Y" direction.

The first to the third circuit breakers 3 to 5 are arranged on a common horizontal floor. The circuit breakers 3 to 5 have substantially cylindrical and elongated shapes, and are arranged so that the longitudinal axes thereof can be all directed to the Y direction. Three portions corresponding to three phases of the first circuit breakers 3, i.e. the first circuit breakers 3a, 3b and 3c are arranged in parallel with and adjacent to one another. Three portions corresponding to three phases of the second circuit breakers 4, and three portions corresponding to three phases of the third circuit breakers 5, respectively, are arranged likewise.

Above the first circuit breakers 3a, 3b and 3c, the first main bus bars 1a, 1b and 1c extending in the X direction are positioned. The positions of the first main bus bars 1a, 1b and 1c are different from one another only in height. Similarly, above the third circuit breakers 5a, 5b and 5c, the second main bus bars 2a, 2b and 2c extending in the X direction are positioned.

The circuit breakers 3 to 5 have two upper outlets each on the upper portion in the vicinity of the both ends thereof. The upper outlets are respectively is connected to the connecting bus bars 12 to 17 extending in the vertical direction. The first disconnecting switches 6 to the sixth disconnecting switches 11 are arranged on and connected to the upper ends of these connecting bus bars 12 to 17, respectively. Each phase of the first main bus bars 1, the second main bus bars 2 and the first disconnecting switches 6 to the sixth disconnecting switches 11 is positioned in common horizontal planes whose heights are different from one another for every phase. The relationship of the positions of the first disconnecting switches 6 to the sixth disconnecting switches 11 in the horizontal direction for every phase is substantially the same, but the positions thereof are shifted slightly in the X direction.

The feeding lines 24 and 25 are extended in the Y direction above the first bus bar 1 and the second bus bars 2, respectively, and pass through the walls of the building 30, then connected to the bushings 28 and 29 outside the building 30, respectively. All phases of the feeding lines 24 and 25 are placed in the same horizontal plane.

In this embodiment, the first circuit breakers 3, the second circuit breakers 4 and the third circuit breakers 5 are arranged being shifted sequentially in the X direction, and arranged so as to be overlapped partially in the Y direction sequentially. More specifically, arrangement is as follows: the connecting bus bars 13 and 14 are lined up in the X direction; the second disconnecting switches 7 and the third disconnecting switches 8 are lined up in the X direction; the connecting bus bars 15 and 16 are lined up in the X direction; and the fourth disconnecting switches 9 and the fifth disconnecting switches 10 are lined up in the X direction.

In this embodiment, the longitudinal axes of the first and the third circuit breakers 3 and 5 are coincident with each other, but only the longitudinal axes of the second circuit breakers 4 are shifted in the X direction. The positions of the second circuit breakers 4 in the Y direction are in the middle of the positions of the first circuit breakers 3 and the positions of the third circuit breakers 5 in the Y direction. More specifically, arrangement is as follows: the connecting bus bars 13 and 14 are lined up in the X direction; the second disconnecting switches 7 and the third disconnecting switches 8 are lined up in the X direction; the connecting bus bars 15 and 16 are lined up in the X direction; and the fourth disconnecting switches 9 and the fifth disconnecting switches 10 are lined up in the X direction.

According to this embodiment, the positions of the second circuit breakers 4 in the Y direction are overlapped with the first circuit breakers 3 and the third circuit breakers 5. Therefore, the width of the first to the third circuit breakers in the Y direction can become small as a whole, so that the distance A1 between bushings can be smaller than the conventional technology shown in FIGS. 10 and 11. In addition, the first, the second and the third circuit breakers 3 to 5, and the disconnecting switches attached to the both ends of the first, the second and the third circuit breakers can be structured as the same unit.

Furthermore, because the first circuit breakers 3 and the third circuit breakers 5 have common longitudinal axes, the width of the first to the third circuit breakers 3 to 5 in the X direction can be made small compared to the first embodiment as a whole. In consequence, the gas-insulated switchgear assembly of this embodiment is economical and capable of reducing the installation area. This gas-insulated switchgear assembly is extremely effective when the width thereof is severely restricted.

Furthermore, because the second disconnecting switches 7 and the third disconnecting switches 8 are connected together via the connecting bus bars 18 on the same axis lines, installation can be carried out without changing the dimension in the direction of the height from the conventional one. As a result, the dimension of the building 30 where the devices mentioned above are installed can be reduced.

Other Embodiments

The embodiments of the gas-insulated switchgear assemblies in accordance with the present invention explained above are merely samples, and the present invention is not restricted thereto. It is, therefore, to be understood that, within the scope of the appended claims, the present invention can be practiced in a manner other than as specifically described herein. For example, though the X axis and the Y axis are crossed orthogonally in the explanation above, these axes may not necessarily be crossed orthogonally if they are crossed at an angle close to the right angle.

What is claimed is:

1. A gas-insulated switchgear assembly for three-phase alternating current transmission comprising, for each phase:
   a first disconnecting switch connected to a first main bus bar;
   a first circuit breaker connected to the first disconnecting switch;
   a second disconnecting switch connected to the first circuit breaker;
   a third disconnecting switch connected to the second disconnecting switch;
   a second circuit breaker connected to the third disconnecting switch;
   a fourth disconnecting switch connected to the second circuit breaker;
   a fifth disconnecting switch connected to the fourth disconnecting switch;
   a third circuit breaker connected to the fifth disconnecting switch;
   a sixth disconnecting switch connected to the third circuit breaker on an end and to a second main bus bar on another end;
   a first connecting bus bar branched off and connected between the second disconnecting switch and the third disconnecting switch, the first connecting bus bar connected to a first feeding line; and
   a second connecting bus bar branched off and connected between the fourth disconnecting switch and the fifth disconnecting switch, the second connecting bus bar being connected to a second feeding line, wherein:
   the first, second and third circuit breakers are arranged in such a manner that longitudinal axes thereof are in parallel with one another in one horizontal plane, the first, second and third circuit breakers for different phases being arranged side by side with one another; and
   the first main bus bars and the second main bus bars are arranged horizontally and in parallel with each other at a height different from a height of the horizontal plane including the longitudinal axes of the circuit breakers and in a direction different from the direction of the longitudinal axes of the circuit breakers;
   at least two out of the first, second and third circuit breakers are shifted in a lateral direction, and are arranged so as to be partially overlapped in the longitudinal direction;
   the first disconnecting switch is arranged in a straight line with the first main bus bar; and
   the sixth disconnection switch is arranged in a straight line with the second main bus bar.

2. The gas-insulated switchgear assembly of claim 1, wherein
   the longitudinal axes of the first circuit breakers and the third circuit breakers are coincident with each other, the positions thereof in the longitudinal direction being deviated from each other; and
   the positions of the first circuit breakers and the third circuit breakers in the direction of the longitudinal axes are arranged so as to be at least partially overlapped with the position of the second circuit breakers in the direction of the longitudinal axes.

3. The gas-insulated switchgear assembly of claim 1, wherein the first main bus bars and the second main bus bars are arranged in a direction perpendicular to the direction of the longitudinal axes of the circuit breakers.

4. The gas-insulated switchgear assembly of any of claim 1, wherein:
   the positions of connecting portions of the first circuit breakers to the second disconnecting switches, and the positions of connecting portions of the second circuit breakers to the third disconnecting switches in the direction of the longitudinal axes of the first circuit breakers coincident with each other; and
   the positions of connecting portions of the second circuit breakers to the fourth disconnecting switches, and the positions of connecting portions of the third circuit breakers to the fifth disconnecting switches in the direction of the longitudinal axes of the first circuit breakers to are coincident with each other.

5. The gas-insulated switchgear assembly of any of claim 1, wherein;
   the first feeding lines and the second feeding lines in all phases are located in one horizontal plane; and
   the first main bus bars in different phases and the second main bus bars in different phases are aligned vertically with a certain distance to one another.

6. The gas-insulated switchgear assembly of any one of claim 1, wherein
   the first main bus bars, the second main bus bars and the first to the sixth disconnecting switches are located in one horizontal plane for a same phase, and located in different horizontal planes for different phases.

* * * * *